Patented Nov. 2, 1937

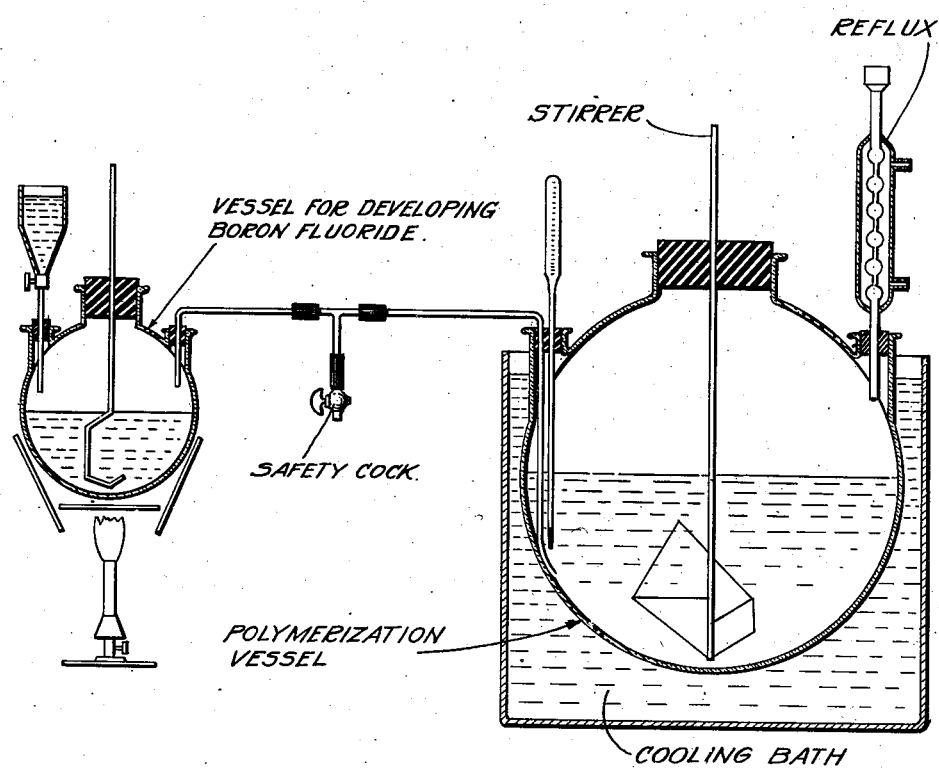

2,097,468

UNITED STATES PATENT OFFICE 2,097,468

PRODUCTION OF HYDROCARBONS OF HIGH MOLECULAR WEIGHT

Hans Rabe, Mannheim, and Michael Otto, Ludwigshafen-on-the-Rhine, Germany, assignors to I. G. Farbenindustrie Aktiengesellschaft, Frankfort-on-the-Main, Germany Application January 19, 1933, Serial No. 652,566
In Germany January 30, 1932

4 Claims. (Cl. 196—78)

The present invention relates to the production of hydrocarbons of high molecular weight.

It has already been proposed to produce high molecular products by subjecting isobutylene to polymerization in the presence of catalysts, advantageously volatile halides, the reaction materials being kept at low temperatures, as for example below 10° below zero C., by strong cooling. The resulting high molecular polymerization products are useful for improving lubricants, such as lubricating oils and greases.

We have now found that valuable high molecular polymerization products are obtained from cracking products which are liquid at ordinary temperatures and which contain substantial amounts, preferably more than 3 per cent by weight of isoolefines, such as those for example obtained by cracking solid or liquid hydrocarbons, in particular hydrocarbon products of paraffinic or naphthenic nature, as for example hard or soft paraffin waxes, ceresine, heavy and middle oils, paraffin oil and petroleum fractions, by condensing (which term for the purposes of the present invention is to include also polymerizing) the said initial materials, preferably in the presence of volatilizable inorganic halides of the Friedel-Crafts type, in the manner described in the specification Ser. No. 623,812, filed July 21st, 1932. Since the condensation is attended by a strong evolution of heat, it is advantageous to stir intensely and to take precautions for a satisfactory withdrawal of heat by sufficiently strong cooling. The temperature of reaction should as a rule not be higher than 10° below zero C., but considerably lower temperatures, as for example 40° below zero C. or even 60° to 100° below zero C. may be employed with advantage.

The condensation products obtained according to the present invention have a molecular weight above 800, more usually above 2000.

The substances of high molecular weight obtained may be employed as additions to solid lubricants, such as greases, or to lubricating oils for the purpose of producing a very flat temperature-viscosity curve. They may also advantageously be added to other sorts of hydrocarbon products, as for example to liquid fuels, such as benzines, in which case they prevent losses of the fuel due to a too great mobility and at the same time provide for a continuous lubrication of the cylinders, or to paraffin waxes or other waxes, in which case they reduce the tendency of the latter to develop fissures. They are also suitable as raw materials together with drying oils for the production of oil lacquers or varnishes.

The said high molecular substances are preferably added to the lubricants or other hydrocarbon products in amounts ranging from one tenth to 10 per cent of the products to be improved but also larger amounts may be added.

The following examples will further illustrate the nature of this invention but the invention is not restricted to these examples.

Example 1

Boron fluoride is led into 1 kilogram of a product obtained by cracking soft paraffin wax at a temperature of 520° C., having a boiling range of 20° to 250° C. (at 760 millimeters of mercury) and a bromine value of 150 and which is cooled to about 60° below zero C. by means of a cooling mixture of acetone and carbon dioxide. By intense stirring, the heat of reaction may be withdrawn to such an extent that the temperature does not rise above 40° below zero C. When the reaction is completed, the whole is allowed to warm up slowly to zero C. and is stirred and washed with water. The oily reaction product, when separated from water and dried, is distilled in a vacuum of 1 millimeter of mercury up to 200° C. A non-sticky residue remains which is extremely tough, is capable of being drawn into long threads and may be kneaded. Its mean molecular weight is 4000. If, instead of employing the whole cracking product, only the fraction thereof boiling up to 100° C. (at 760 millimeters of mercury) be employed, a residue of 550 grams having a mean molecular weight of 5000 remains behind after the distillation.

Example 2

40 grams of aluminium chips and 2 grams of mercury chloride are added to 1 kilogram of a cracking product as described in Example 1. The whole is cooled to 20° below zero C. and a weak current of hydrogen chloride gas is led through for three days in such a manner that the temperature does not rise above 15° below zero C. After working up the reaction product in the manner described in Example 1 it is subjected to distillation up to 250° C. in a vacuum of 1 millimeter of mercury and 300 grams of a very viscous tough residue having a mean molecular weight of 2500 are obtained.

What we claim is:—

1. A product having a molecular weight of at least 800 and resulting from the polymerization, in the presence of a volatilizable inorganic halide of the Friedel-Crafts type and at a temperature below 10° below zero C., of a normally liquid product containing isoolefines and resulting from cracking a from solid to liquid hydrocarbon product of essentially paraffinic nature.

2. A product having a molecular weight of at least 800 and resulting from the polymerization, in the presence of a volatilizable inorganic halide of the Friedel-Crafts type and at a temperature below 10° below zero C., of a normally liquid product containing isoolefines and resulting from cracking a paraffin wax.

3. The process of producing a valuable polymerization product which comprises subjecting to polymerization, in the presence of a volatilizable inorganic halide of the Friedel-Crafts type and at a temperature below 10° below zero C., a normally liquid product containing isoolefines and resulting from cracking a from solid to liquid hydrocarbon product of essentially paraffinic nature.

4. The process of producing a valuable polymerization product which comprises subjecting to polymerization, in the presence of a volatilizable inorganic halide of the Friedel-Crafts type and at a temperature below 10° below zero C., a normally liquid product containing isoolefines and resulting from cracking a paraffin wax.

HANS RABE,
MICHAEL OTTO.